United States Patent [19]
Green

[11] Patent Number: 5,421,947
[45] Date of Patent: Jun. 6, 1995

[54] LAMINATING MACHINE

[76] Inventor: Diane Green, 730 St. Clarens Ave. #703, Toronto, Ontario, Canada, M6H 4E8

[21] Appl. No.: 125,302

[22] Filed: Sep. 23, 1993

[51] Int. Cl.⁶ .............................................. B32B 31/00
[52] U.S. Cl. ..................... 156/464; 156/216; 156/461; 156/468; 156/479; 156/483; 156/484; 156/555; 156/583.1
[58] Field of Search ............... 156/196, 216, 443, 459, 156/461, 464, 468, 465, 475, 479, 483, 484, 519, 521, 516, 517, 552, 555, 556, 583.1; 493/445

[56] References Cited

U.S. PATENT DOCUMENTS

| | | | |
|---|---|---|---|
| 4,278,488 | 7/1981 | Kopacz et al. | 156/351 |
| 4,698,114 | 10/1987 | Lowe | 156/352 |
| 4,710,256 | 12/1987 | Ladewig et al. | 156/484 |
| 4,750,966 | 6/1988 | Koller | 156/391 |
| 5,277,722 | 1/1994 | Block et al. | 156/64 |

*Primary Examiner*—David A. Simmons
*Assistant Examiner*—J. Sells

[57] ABSTRACT

Disclosed is a laminating machine for applying a protective laminate to the edge of any paper or paperboard product such as an index or paperboard card. The machine includes grippers for retaining opposed edges of a cut laminate and an elongate crimping mechanism for engaging the laminate between the grippers and for pressing the laminate against the nip of a pair of pressure rollers. The elongate crimping mechanism is withdrawn and an edge of the paper or paperboard product is fed to the elongate crimp created in the laminate. The paper and laminate are then fed between heated pressure rollers to effect lamination. The above steps can be repeated to apply a laminate to two or more edges of a paper or paperboard product. When two or more adjacent edges are to be laminated, a cutting mechanism cuts the laminate at angles to form miter joints at the corners.

10 Claims, 7 Drawing Sheets

Fig. 19
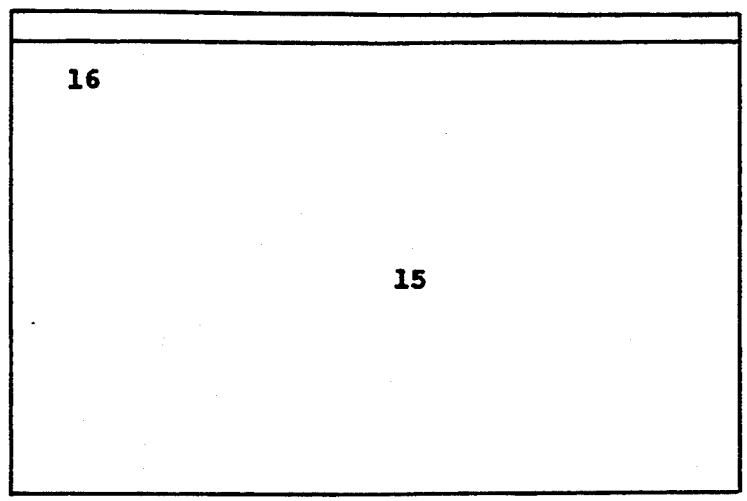
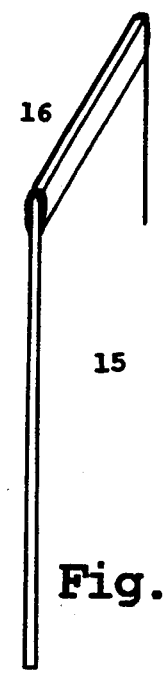
Fig. 20
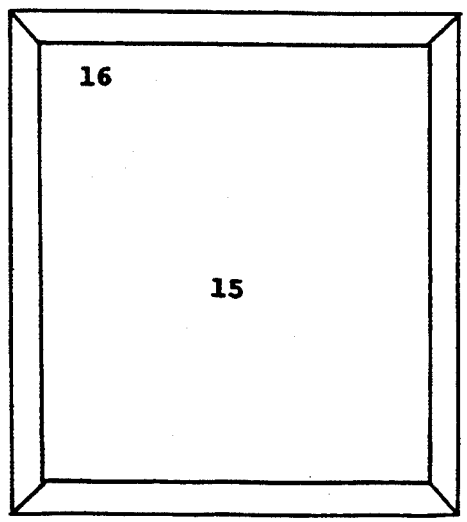
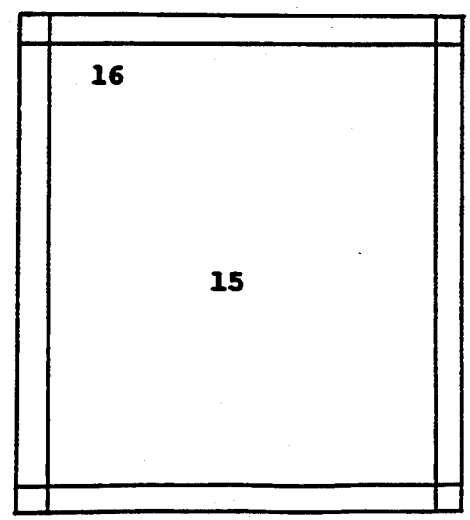
Fig. 21        Fig. 22

LAMINATING MACHINE

BACKGROUND AND SUMMARY

It is common today for laminating machines to laminate either the front or back or even both sides of a paper or paperboard product. Unfortunately the entirety of these "pristine cut edges" are left unprotected. And as a result, the edges are prone to deterioration due to excess handling. Presently there are laminating machines on the market whereby indexes/or index guide cards or the like can be laminated in a wraparound process. But only the projection is laminated, leaving the remainder of the paper or paperboard unprotected. Since the projection is the portion touched, there isn't a need to laminate the remaining portion of the card. Clearly these laminating machines are restricted to the type of products they can produce. The laminates can only be of a certain depth and measurement. Furthermore, these machines do not have the ability to deviate greatly in production variations as does the present laminating machine, the Imperial Laminator.

These disadvantages may be overcome by using a laminating device such as the "Imperial Laminator" as it will have a base program allowing for the ability to significantly alter or change specifications required from job to job while producing a multitude of fine paper goods.

It is important to note that the term "pristine cut edges" in this invention refers to the raw edge of a single layered piece of paper or paperboard and not one that is doubled over or folded in any way or form. Also the term "laminate" in this invention refers to any suitable coating applied to the entire "pristine cut edges" that will prevent deterioration to that edge or multiple edges by excess handling. "Suitable materials" refers to any viable protective materials including: a liquid resin (later cured or solidified upon application to paper); flexible vinyl or plastic material would be preferred when it comes to the manufacture of these types of paper products.

In regards to this process and the machinery used to produce the final product; a modified index/paperboard card; for example, and/or any other paper or paperboard products will have the ability to a) provide a protective coating for areas as small as approximately ⅛ inch or more in depth ×2 sides. Except in the case of a liquid resin which may be bonded to only the pristine cut edge(s) if desired with no material run off whatsoever; b) allow for the lamination of an index/paperboard card or other paper or paperboard products as small as 2 to 40 inches in length(s) or more if desired; c) be capable of coating one entire edge of the index/paperboard card or other paper or paperboard products in a wraparound process or two entire edges of the paperboard (preferably opposites) at one time, then the others if required as the product moves along some sort of assembly line, manual or mechanical. No portion of the "pristine cut edge" is to be left exposed or vulnerable to the possibility of deterioration. For example, no part of an index/paperboard card treated by the "Imperial Laminator" is meant to be eliminated in any way such as the index guide card.

A brief study of the index card will reveal a common weakness; they are outrageously frail. In other words they have a very short life span. Today's index cards are thin and unable to endure even the mildest of handling without the obvious signs of adulteration. Therefore it is necessary to protect them from the very real possibility of becoming either bent, frayed, dirty or tattered because of this handling. "Guide Cards" are cut to allow an upright projection showing one-fifth, one-third, or one-half the length of the cards, and stand one-half a centimeter (0.5 cm) above them; so that in a series of guides in sequence one does not obscure the view of the other. These index guides, the A,B,C-Z, as well as the "blanks" were historically designed to prevent against excess fingering of the many index cards within the filing system. Any entry in a properly guided card catalog was found by simply touching one or two cards, whereas fewer guides would necessitate a much greater amount of fingering. The once manufactured "linen ledger" index card patented by the Library Bureau as far back as 1902 was intended to last some fifty years and is not as readily available today since the card catalogs of the world are not as extensive as they once were. Even back in 1902, the "bristol" type cards seen in libraries were to be used only as a temporary means until information could be later transferred onto the excellent stock card. Commercial organizations were given the choice of using this "inferior" bristol type card. It all depended upon the need for "preservation". Today, these "inferior" bristol type cards are the consumers only recourse and are still seen as a temporary device in libraries. Therefore the purpose of this invention is to provide a sturdier paper/paperboard product; one with a longer life span where it's still needed.

As to the historical "guide cards", only the projection of it is protected by these aforementioned laminating machines. When it comes to the laminating of a single guide card, a tiny piece of plastic material, commonly known as Mylar or something similar to it, is cut from a roll, and usually placed over the section containing either a letter from the alphabet or possibly even a number. Blanks are also available; somewhere along the edge is a protected projection. The paper edge surrounding either the letter or number is cut away with a punch. If this excess material weren't cut away, the purpose of the historical guide cards wouldn't be realized. Again, the purpose being: not to obscure the view of the other.

Due to the frailty of index cards today; unfortunately we don't have access to the ones made of linen ledger anymore, the "guide cards" can only do so much. But with the "Imperial Laminator", the problem of deteriorating index cards has come to an end. This modified card contains no projection whatsoever. Every index/paperboard card should be flush with the others; either before or after it, they are all the same according to size. It is to be understood that this invention covers any paper or paperboard product that is not used for indexing or for information projected thereof beyond the product. That all paper or paperboard products equipped with this protective coating will usually be flush to all other parts within the product itself, for instance a notebook with no projections whatsoever but a coating on the cover(s) or pages found inside.

Be it known that the protective coating; however dispensed and applied to the paper/paperboard product, is to be constructed of any viable material, although a liquid resin, vinyl or plastic material(s) would be preferred. In the case of a liquid resin (later cured or solidified once applied to either an index/paperboard card or other paper/paperboard products 1); it is adapted to be applied by any one of the following processes; sprayed, dipped, or brushed on to the paper/paperboard as seen in FIG. 20, to form a suitably measured, yet sealed edge. Any means of bonding or setting this liquid resin after it's been applied to the paper may be used, although a beam of ultra-violet light is preferred. Also it is to be understood that the liquid resin can be bonded to only the pristine cut edge(s) with no material run off whatsoever. And the fact that such a liquid resin could even be applied to either a bound/or unbound paperback book or the like should not be overlooked; it could altogether encompass both the outer surface area and multiple pristine cut edges if so desired.

In the case of a flexible vinyl or plastic: it is adapted to be bent over or wrapped around to entirely rest against opposite sides of the paperboard as seen in FIG. 20, to form a complete sealed edge. This protective coating is preferably administered by means of some adhesive material at the manufacturing level. Although the place of fastening the vinyl or plastic coating constitutes no part of the present invention. But with any of these constructions as outlined in this invention, it will be apparent that any or all pristine cut edge(s) of this or any other paper/paperboard products will be entirely sealed within any of the aforementioned coatings—or any other viable protective coatings thereof. And it is to be understood that this protective coating whether it be a liquid resin, vinyl, plastic—or any other viable material—may be applied either by manual or mechanical means. And the manner of applying this coating whether it be a liquid resin, vinyl or plastic as outlined above—or any other feasible way of applying these or other protective coatings to the entire pristine cut edge(s) of any paper/paperboard products are to be included in this invention. Note that these coatings should be as flush to the paper as possible so as not to cause excess bulk of any nature. Although the configuration of these or any other coatings constitute no part of the present invention. Also note that this protective coating can come in a variety of colors to a) match the paper/paperboard color itself i.e. pink or yellow coating for solid color cards; b) enhance the plain white card by adding a strip of color for color coding purposes; c) also come in basic white to again match the paper/paperboard product or a simple transparent coating.

In fact this protective material or laminate is to be applied in such a manner that it ultimately encapsulate the paper/paperboard in any of the following ways: a) the whole or partial surface(s) and fibres at all the pristine cut edges in a wraparound process; b) the whole or partial surfaces and fibres at any one or more pristine cut edges in a wraparound process; c) any one or more pristine cut edges only with no material run off whatsoever.

BRIEF DESCRIPTION OF THE DRAWINGS

FIG. 19 is a partial sectional view of the paper/paperboard product treated by the Imperail Laminator;

FIG. 20 is a perspective view of the paper/paperboard product treated by the Imperial Laminator;

FIG. 21 is a partial view of the paper/paperboard product treated with diagonally cut edges of laminate;

FIG. 22 is a partial view of the paper/paperboard product once treated with straight cut edges of laminate.

DESCRIPTION OF THE PREFERRED EMBODIMENTS

Figure 1:
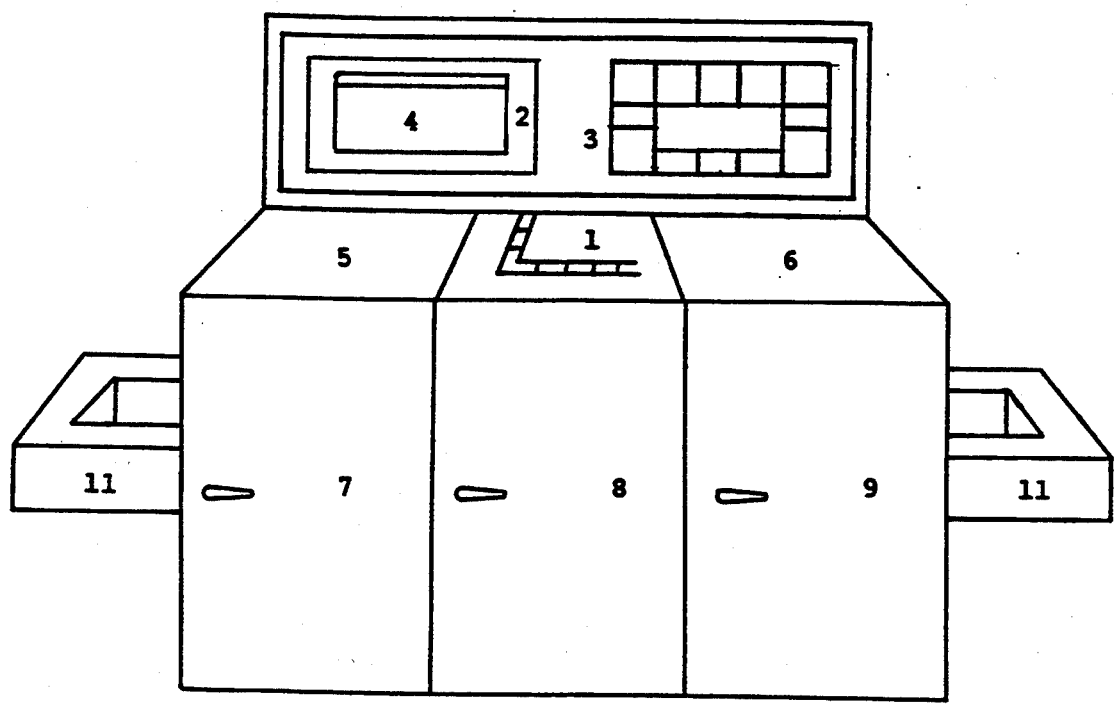
FIG. 1 is a partial sectional view of the Imperial Laminator constructed in accordance with a preferred embodiment of the invention.
Figure 2:
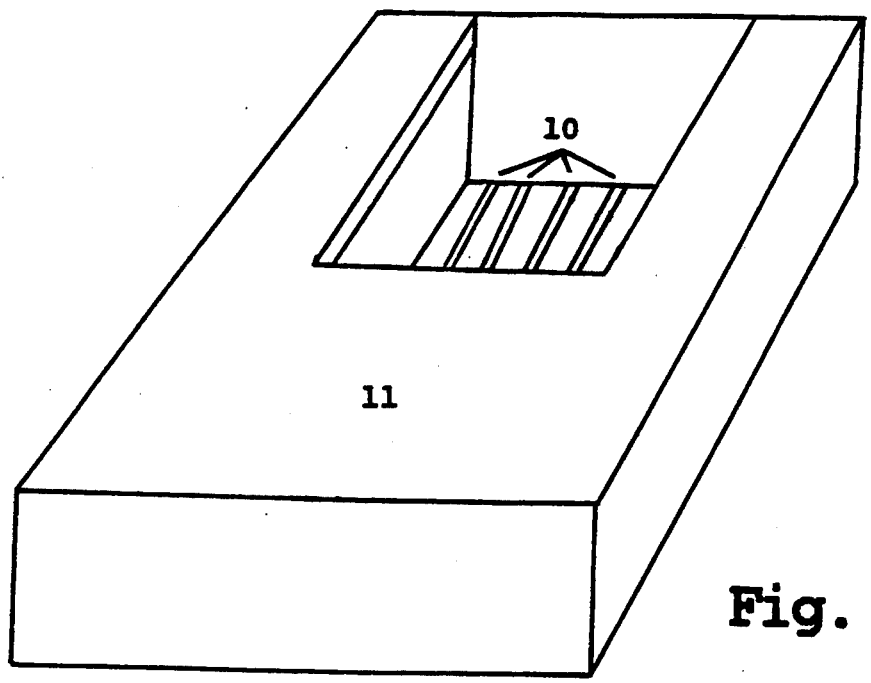
FIG. 2 is a partial sectional view of the paper/paperboard tray feeder.
Figure 3:
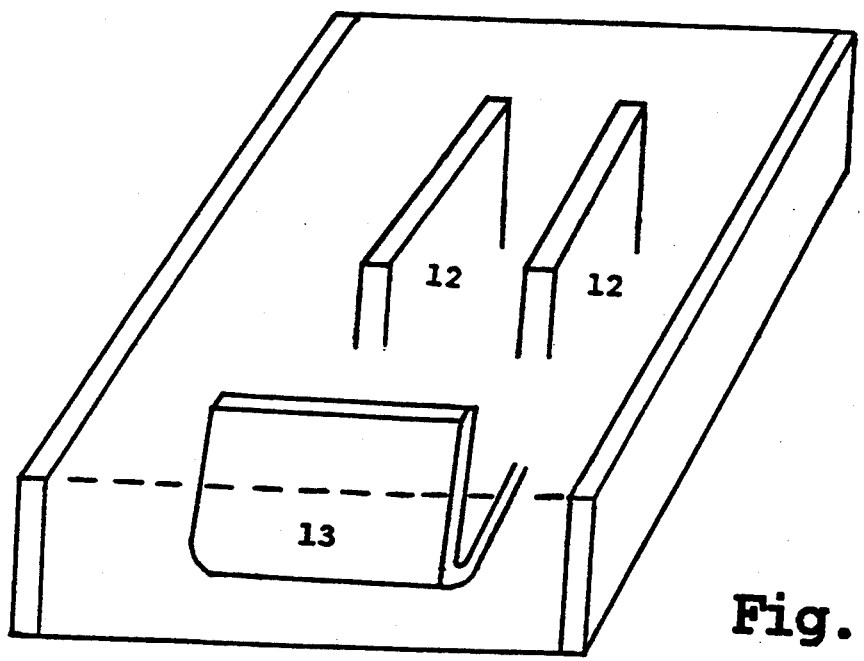
FIG. 3 is a perspective view of the paper/paperboard tray feeder without the cover.
Figure 4:
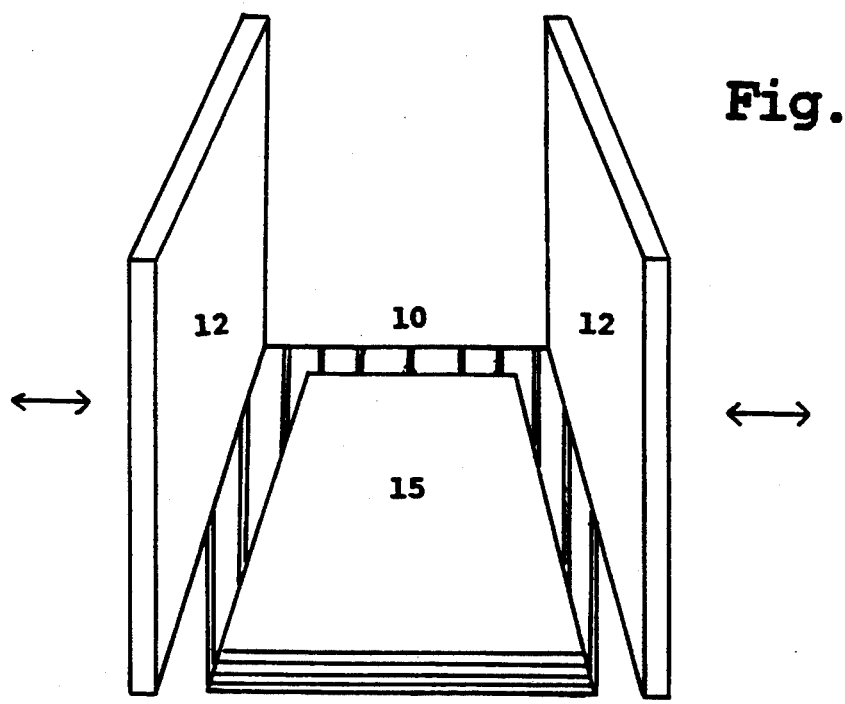
FIG. 4 is a perspective view of the paper/paperboard loaded within the paper guides.

In drawings which illustrate embodiments of the invention, FIG. 1 is an elevation showing an overall look; only one of many potential versions of the Imperial Laminator, from the front. Provided is a type of measuring tool such as a grid 1 on the top or working surface of the machine. It could also be equipped with either a mounted (or independent) computerized keyboard 3 and monitor 2; attached by cord if not mounted—with programmable features. Here are just some of the features offered by the Imperial Laminator Monitor. They are as follow: a) number of pieces modified; b) size of pieces modified; c) amount of laminate used per job; d) size of laminate loaded into the machine; e) low level indicators; f) paper jam indicators; g) trouble spot indicators. The user could be able to specify by punching a few buttons 3 here and there the total measurements of the particular paperboard product being laminated. Once the length and width has been determined, these numbers are carefully punched into the keyboard. If laminating an index card measuring 5×3 inches; for example, the user could then be asked what the desired margin is. Answer: 5 inches in length; and an ⅛ of an inch deep ×2 sides. Therefore, the roll of laminate loaded into the machine would be a total of ¼ of an inch wide. The inner makings of the machine could then start to move, preparing itself for the job. Meanwhile, since the machine's program fully understands that the rolls of laminate are to be crimped precisely in their middle (unless otherwise specified), an accurate display 4 of what the finished product should look like will be projected for the user to see. For example, the projection of the index card may appear in yellow. While the designated laminate size may appear in green. Specifications for each job may vary. But setup control remains in memory until the next available job. Roll size as well as paperboard length and laminate width sizes chosen will remain in memory at all times unless a changing of these specifications are required. The feeder in FIG. 2 should act similar to that of a photocopier in that a suction action takes place. Strips with gripping ability 10 varying from one to three or more, should carry one piece of paperboard at a time to the inner makings of the machine. The smallest paperboard measurement may be as little as 2 inches; the largest being approximately 40 inches in length (i.e. poster size) or more if desired. Note that the feeder preferably located on the right hand side of the machine will be equipped with a movable cover 11. This cover is shaped like that of the letter U for aesthetic purposes. If a small product is to be put through the machine, then this lid is to be left as is during operation. The guides may be adjusted accordingly. If the paperboard product going through the machine happens to be larger than say $8\frac{1}{2} \times 11$ inches, the lid would then be removed to allow for machine ajustments, such as guides being widened to accommodate the excess length and width of this paperboard product. FIG. 3 is a view of the paper feeder without the cover. FIG. 4 is another view of the paper feeder without the cover and loaded with paper. The paper feeder unit is to be adjustable moving either up or down as required to one of three working levels, as specified below. The guides themselves 12 in FIG. 3 measure approximately 12 inches high, 2–3 inches in width and $\frac{1}{2}$ inch thick, to allow for the placement of several paperboard products such as the index card. The user should be able to place at least 1000 index cards at a time—one on top of the other—in between these guides without the worry of these cards shifting out of place. Another guide 13 in FIG. 3 is approximately 12 inches high, 8–10 inches in length and $\frac{1}{2}$ inch thick to help aid the guides 12 in FIG. 3. This guide 13 though, is adjustable either in or out.

Figure 5:
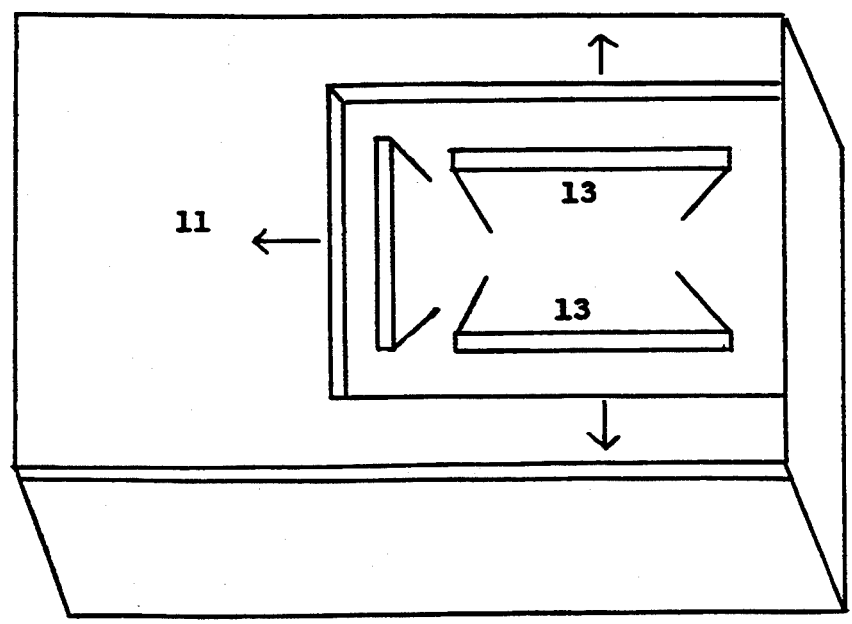
FIG. 5 is a perspective view of the paper/paperboard exit tray.

Once the paperboard product has been treated with laminate it comes out to rest on the paper tray, FIG. 5. The design is the same as that of the paper feeder, FIG. 2 but minus the strips with gripping ability. As well, the paper exit tray is programmed to automatically drop if a big job is in progress, therefore causing a stacking effect. And in turn keeping the product in the best possible condition. In other words, no backups! The guides 13 are all adjustable as well, both with the cover on or off. In case of paper jams, the doors 7, 8, 9, in FIG. 1 should open to allow the user to remove the damaged materials.

Figure 6:
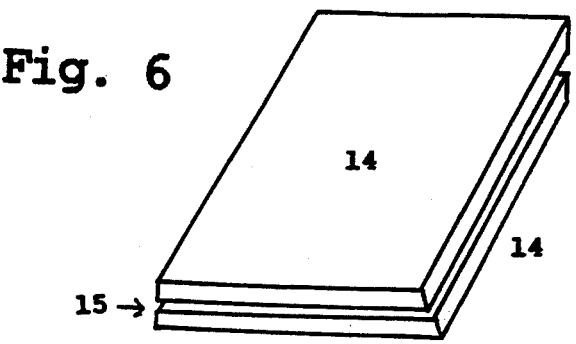
FIG. 6 is a perspective view of identically measured beds as outlined in the invention.
Figure 9:
FIG. 9 is a partial sectional view of the adjustable housing mechanism.
Figure 8:
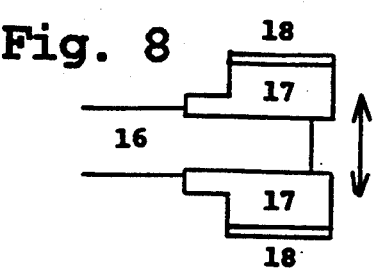
FIG. 8 is a sectional view of the adjustable housing mechanism.
Figure 7:
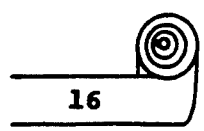
FIG. 7 is a perspective view of a roll of laminate.

When the paperboard product has been drawn or sucked inside the machine through the paper feeder, it sits in between two identically measured beds, FIG. 6, one on top of the other with the aid of some gripping material or suction on or near the beds. There are three levels in all, six pieces according to the specification above. Approximate measurements of these beds are as follows. Level 1: 12 inches in length. Level 2: 24 inches in length. Level 3: 40 inches in length. It's important that these beds be appropriate in design to accommodate all the various sized pieces of raw product eventually to pass through the machine. During programming mode, the processing unit most suitable for the job will have been selected. Level 1, 2, 3, will have moved into action depending on the requirments as designated by the user. The body of the machine should allow for the placement of at least one roll of laminating material. FIG. 7, per level. In the event that only one processing unit be used for the manufacture of this machine, then more than one roll of laminate may be loaded into the machine. The crimper, non-heated rollers and rods housing the claws would all measure approximately 40 inches in length. The claws would have to be small enough to handle intricate sized pieces of laminate such as $\frac{1}{4}$ inch wide or more. The purpose of having three processing units is to save on energy. It takes more power to operate oversized machinery, especially when not in use. For example, laminating a small index card measuring $5 \times 3$ would take less energy than to laminate a poster measuring $24 \times 36$. The roll(s) of laminate would range anywhere in size from $\frac{1}{4}$ inch to 4 inches or more. There are not restrictions on the size of the laminate chosen except that it must have the ability to completely seal the edge of the paperboard product. Easy access to these rolls are a must in case the roll color or size has to be frequently changes. These rolls of laminate sit in between adjustable housing mechanisms, 17 in FIG. 8. There are three of them in all located just inside the front door 8 or 9 in FIG. 1, but just ahead of the beds. In the event that only one processing unit were used instead of three, then the roll(s) of laminate may possible be loaded into the machine through a door located on the top working surface of the machine 6 in FIG. 1. FIG. 9 is another sideways view of the adjustable housing mechanism guide or lead. A set of rotating pads 18 in FIG. 8 found inside the adjustable housing mechanism will aid in the feeding of laminate to the processing unit. These pads are meant to cushion the roll of laminate as well as control it for easy maneuverability.

Figure 11:
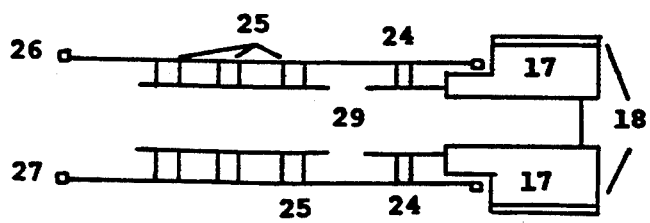

Operation of the processing units (3 of them in all; which consist of a crimper 20 in FIG. 12, non-heated rollers 21 and various types of claws 25 and a blade 29) are as follows: once a roll of laminate suitable for the job has been selected, it sits in between the adjustable housing mechanism. And a claw in a line of claws 25 in FIG. 11 latches on to the roll of laminate and thus draws the cut edge of it across—with the help of a rod as a guide 26 in FIG. 11. Note that another of these carrying devices is duplicated underneath 27 in FIG. 11 so that the laminate 16 is accurately controlled at all times. More than one claw from the top and bottom may be used 25 in FIG. 11. The size of the claws may vary from level to level. The most important consideration when selecting the size of claws is the assurance of accuracy when dealing with smaller pieces of laminate. Level 1 would probably accommodate the most delicate of laminating needs. The following are approximate rod size measurements. Level 1: 12 inches in length with three claws, two movable; one dormant and a blade. Level 2: 24 inches in length with five claws, four movable; one dormant and a blade. Level 3: 40 inches in length with seven claws, six movable; one dormant and a blade. The blade should have the ability to move both up and down and cut a laminate measuring $\frac{1}{4}$ inch to 4 inches wide and more. Also, these blades should be able to cut straight edges as well as diagonal ones if required. Therefore a product could be laminated on all four sides in a uniform manner without overlapping material. During the programming mode, for example when the user specifies that a poster measuring $24 \times 36$ is to be laminated the computer program should be able to accurately measure and thus guide the blade to cut the laminate accordingly as seen in FIG. 21. FIG. 22 indicates how a product would look with all four sides laminated using a straight cut edge, thus causing the material to overlap. It is to be understood that a single blade guided by a vertical rod may be used for all three processing units.

Figure 10:
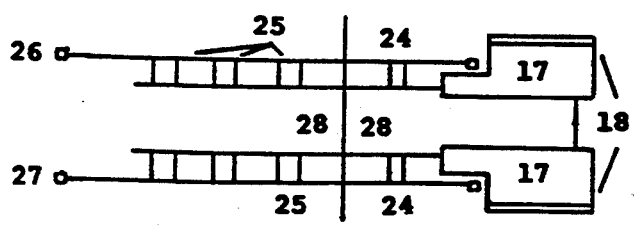
FIGS. 10–12 are parial sectional views of the processing unit at various stages.
Figure 12:
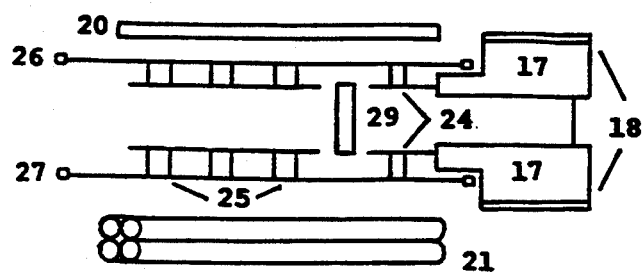
Figure 13:
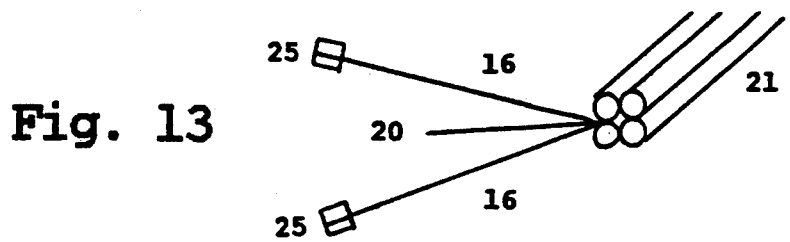
FIG. 13 is a perspective view of the crimping mechanism.
Figure 14:
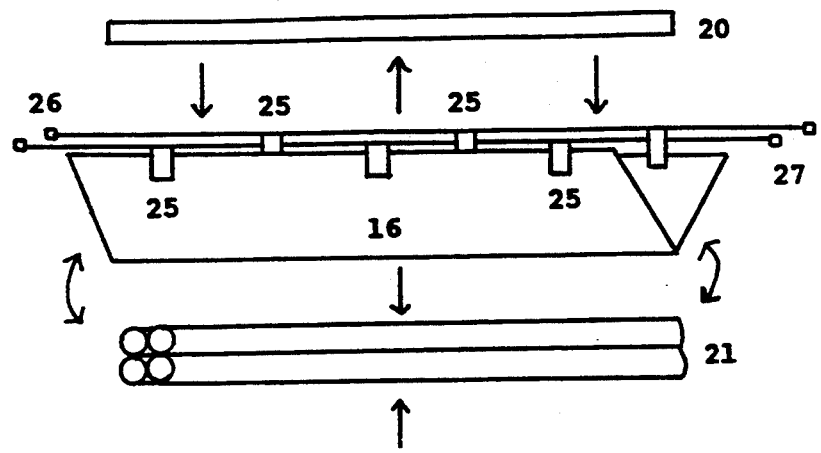
FIG. 14 is a partial view of the crimping mechanism.
Figure 15:
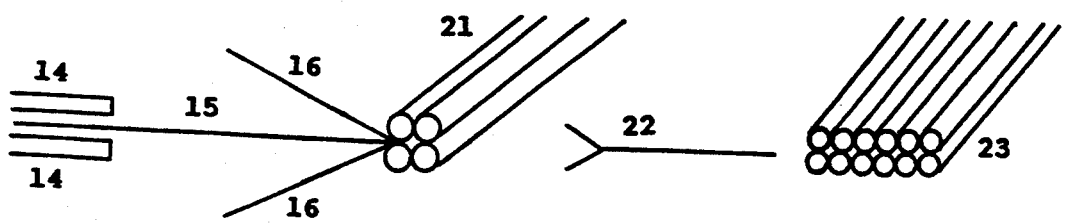
FIG. 15 is a perspective view of the laminator.
Figure 16:
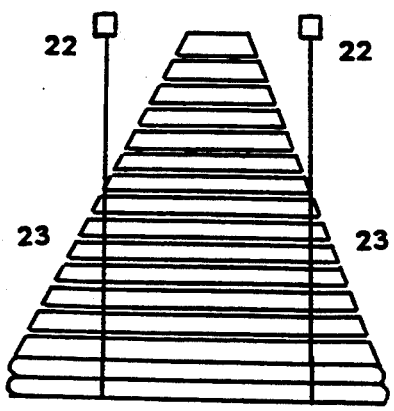
FIG. 16 is a partial view of the heated pressure rollers.
Figure 17:
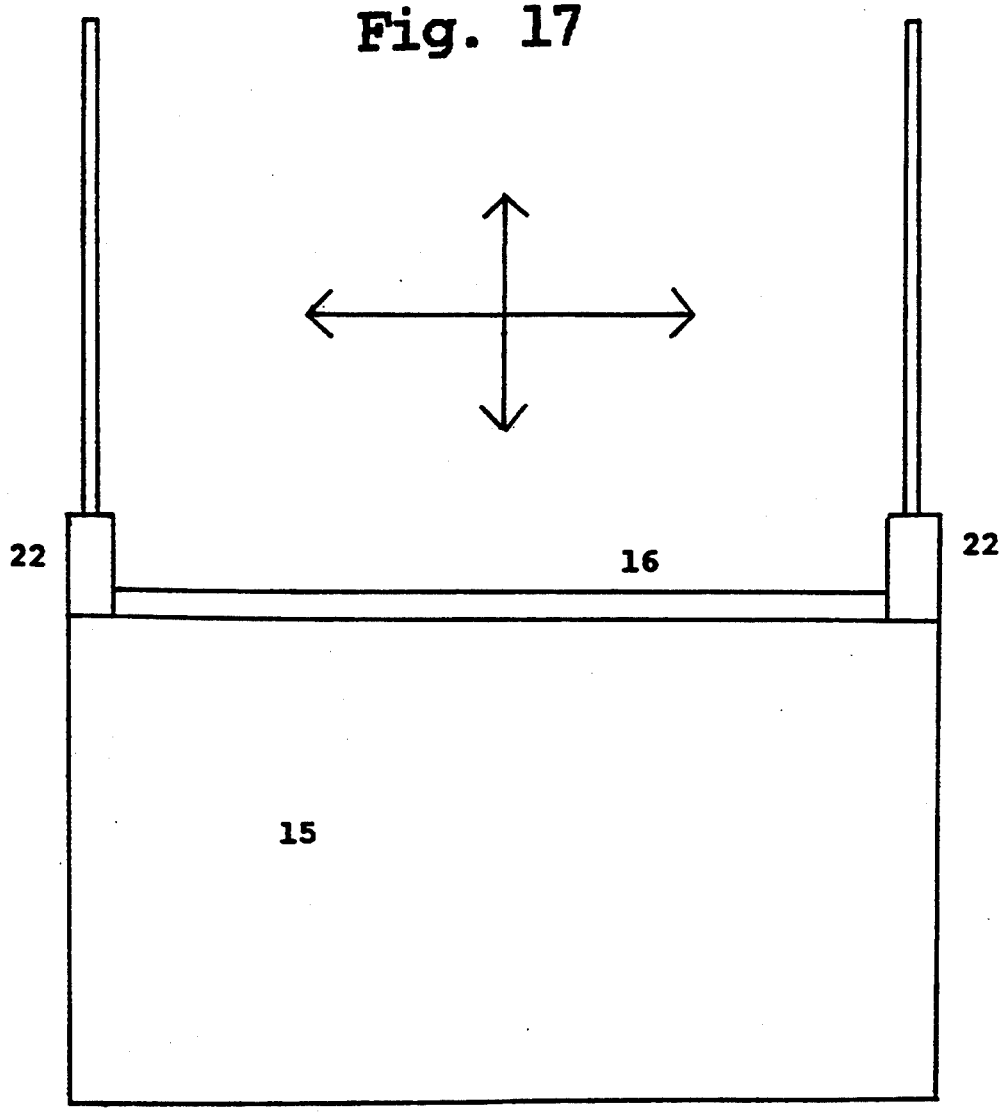
FIG. 17 is a partial view of a piece of paper/paperboard merged with a piece of pre-folded laminate.
Figure 18:
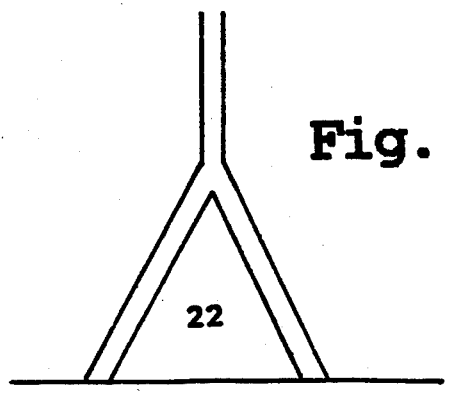
FIG. 18 is a perspective view of the gripping claws in the open position.

Or one in the event that only one processing unit were used. The claws found on each of the aforementioned rods are shaped like that of an upside down letter V (with a sufficient amount of strength; more is needed for smaller, delicate pieces of laminate. There is absolutely no room for error when it comes to the design of the claws for the laminate cannot become loose during processing). These claws should open and close on demand, and thus grip and carry the laminate when required to do so. The rods are designed as free moving agents, completely separate from the adjustable housing mechanism. But thse rods must be close enough to this adjustable housing mechanism to allow for the feeding of laminate to the processing unit. It is to be understood that to improve speed and productivity of the Imperial Laminator, there may be a second set of partnering rods equipped with claws and a blade per level. These backup rods are to be fed with laminate while the unit before it is in motion with crimper and rollers. Note that both the rods and adjustable housing mechanism 17 in FIG. 8 have the ability to adjust for the insertion of laminate of any size, eg. ¼ inch to larger sizes. Also the claws 25 in FIG. 14 on the rods must have complete flexibility so that they can swing back and forth when required. As well they should be able to stop in midswing and hold that pose as in FIG. 13. The program has now just told the processing unit where and when to stop. And that is when the desired amount of laminate has been measured off. With the dormant claws holding onto the laminate, a blade quickly cuts it in two 29 in FIG. 11. When the piece has been cut from the roll, the appropriate set of claws either two, four or six of them will then carry the laminate across the rods and stop in direct line of the paperboard product sitting in wait of modification 15 in FIG. 6. The dormant claws should be in position just before the cutting point 28 in FIG. 10. So that the roll of laminate is held up and ready to supply material for the next paperboard product. As the material is being cut, these dormant claws should be closed. And as the material is being drawn from the roll down the rods by the movable claws, the dormant claws should be open and so forth. Now that the laminate has been accurately measureed and cut, a crimper 20 in FIG. 12 takes over. The purpose of the crimper is to put a fold or seam in the laminate. The crimper should work in unison; precision perfect, with a set of mini-rollers 21. The crimper can be a very thin, flat piece of any suitable material. Approximate measurements of these (3 of them in all) are as follows. Level 1: 12 inches in length. Level 2: 24 inches in length. Level 3: 40 inches in length. The crimper should be one that assures a precise yet appropriate seam or fold. Note that the fold in FIG. 12 is not required to be directly in the middle of the laminate. If desired, the user can change the folding point to allow for more of a laminate on one side of a paperboard product. Therefore the crimping device as well as the beds and rollers should attempt to align themselves until the desired point of contact has been established. These alterations have to be 100% accurate and will therefore will be controlled by the computer. Now that the desired point of contact has been established, the crimper and rollers begin to merge and thus cause a seam or fold in the laminate before quickly separating as seen in FIG. 14. The crimper then moves out of the way, positioning itself either just above or below the appropriate beds. Note that the laminate 16 is still being held up by the claws 25 located on the two partnering rods. Again, these claws have flexibility in that they can swing back and forth on demand as seen in FIG. 13. So now that the rollers 21 in FIG. 14 have reversed themselves and the crimper 20 is also out of the way, the claws 25 are in a rigid position. The laminate 16 is somewhat in the shape of a sideways letter V and the claws will maintain the rigid hold until the paper 15 in FIG. 15 that was being held between the beds 14 starts to merge with the laminate 16. Now that the paperboard product has started to move, its goal is to merge with the seam or fold in the laminate. From there the paper and laminate will pass entirely through the rollers 21 in FIG. 15 toward a second set of rollers 23 in FIG. 15, these being of the heated type. But let us not forget about the claw and their firm grip upon the laminate. As soon as the merged products (paper and laminate) make contact with the non-heated rollers 21 and thus begin entry, the claws will release their grip. While the paperboard product is passing through the non-heated rollers, another set of claws 22 in FIG. 15 or 22 in FIG. 16 is preparing to latch on to the product (laminate already in place) from both the far left and right edges as seen in FIG. 17. FIG. 18 is another view of these claws open. It is to be understood that these claws are free moving in all directions (up, down, forward and backward) during operation, according to requirements. They should accommodate the size of any paper/paperboard product treated with laminate, whether it be a margin of 2 inches or 40 inches in length or more. These claws will then accurately guide the product toward the heated rollers. In FIG. 16, 23 is a view of these rollers. There are two tiers 23 in FIG. 15, one on top of the other. So that a paperboard product dressed with laminate can pass through them and realize the full benefit of heat. The adhesive—in the event that a Mylar type product were used—found on the reverse side of the laminate would be activated and thus causing it to adhere to the paper. Also these rollers are to be made movable up or down to the appropriate level in use, either 1, 2, or 3. There is no need to have three of these heating systems in place. In the event of paper backups or jams in the heated roller section, a door 5 in FIG. 1 should open up. And these rollers shouls separate (and thus look like a sideways letter V) upon the opening of this door, allowing the user easy access to remove anything caught up in the machinery. FIG. 19 is a view of the paperboard product treated by the Imperial Laminator. Note that only one edge has been treated. But there are no restrictions on the number of edges having to be modifies. FIG. 20 is a sideways view of the paperboard product as treated by the Imperial Laminator. Again, FIG. 21 is a view of paperboard once treated with diagonally cut edges of laminate. FIG. 22 is a view of the paperboard once treated with straight cut edges of laminate.

What is claimed is:

1. A laminating machine for applying a protective coating to the edge of any paper or paperboard product, said laminating machine comprising:
    means for feeding a laminate film;
    at least two gripper means for gripping and retaining opposed edges of said laminate film;
    cutting means for cutting said laminate film to a desired length;
    at least one pair of opposed pressure rollers;
    crimping means further comprising an elongate member for engaging said laminate film between said gripper means along substantially the entire width of said laminate film, means for pressing said crimping means against the nip of said pressure rollers to crimp or crease said laminate film;

means for disengaging said crimping means from said laminate film and said nip of said pressure rollers;

feeding means for feeding a paper or paperboard card to the crimped or creased laminate film wherein the leading edge of the card engages the laminate film along the formed crimp or crease;

means for laminating said laminate film to said card.

2. The laminating machine as defined in claim 1, wherein said means for laminating comprises said at least one pair of opposed pressure rollers.

3. The laminating machine ad defined in claim 2, wherein said means for laminating further comprises at least one pair of heated pressure rollers.

4. The laminating machine as defined in claim 1, wherein said cutting means cuts said laminate film into rectangular portions.

5. The laminating machine as defined in claim 1, wherein said cutting means cuts said laminate film in a configuration which, when laminate films are applied to plural adjacent edges of a card, the laminate films form miter joints at the corners.

6. The laminating machine as defined in claim 1, wherein said at least two gripping means are adapted to receive laminate films of varying thicknesses.

7. The laminating machine as defined in claim 2, wherein said gripper means comprises at least two pairs of gripping members and said means for laminating comprises at least one pair of opposed pressure rollers narrower than the distance between said two pairs of opposed gripping members and at least one pair of opposed pressure rollers wider than the distance between said two pairs of opposed gripping members.

8. The laminating machine as defined in claim 7, wherein said at least two pairs of gripping members engage said laminate while said laminate travels through said narrow opposed pressure rollers.

9. The laminating machine as defined in claim 1, wherein said feeding means for feeding a paper or paperboard card is adjustable to receive paper or paperboard cards of various sizes.

10. The laminating machine as defined in claim 1, wherein said means for feeding a laminate film is adjustable to receive laminate films of various sizes.

* * * * *